United States Patent
Kerler et al.

(10) Patent No.: US 6,909,069 B2
(45) Date of Patent: Jun. 21, 2005

(54) BAKING OVEN

(75) Inventors: Ernst Kerler, Ganheim (DE); Michael Koos, Heugrumbach (DE); Leo Holzinger, Schwebenried (DE)

(73) Assignee: Miwe Michael Wenz GmbH, Arnstein (DE)

( * ) Notice: Subject to any disclaimer, the term of this patent is extended or adjusted under 35 U.S.C. 154(b) by 0 days.

(21) Appl. No.: 10/433,025

(22) PCT Filed: Aug. 9, 2002

(86) PCT No.: PCT/IB02/03171
§ 371 (c)(1),
(2), (4) Date: Oct. 24, 2003

(87) PCT Pub. No.: WO02/089588
PCT Pub. Date: Nov. 14, 2002

(65) Prior Publication Data
US 2004/0055589 A1 Mar. 25, 2004

(30) Foreign Application Priority Data
Oct. 1, 2001 (DE) ........................ 101 48 548

(51) Int. Cl.[7] .............................. A21B 1/26; A21B 3/04
(52) U.S. Cl. ..................................... 219/400; 126/21 A
(58) Field of Search ................ 219/400, 401, 219/385, 386; 126/20, 21 A

(56) References Cited

U.S. PATENT DOCUMENTS

| 4,516,012 | A | * | 5/1985 | Smith et al. ................ 219/400 |
| 4,831,238 | A | * | 5/1989 | Smith et al. ................ 219/400 |
| 4,873,107 | A | * | 10/1989 | Archer ....................... 426/520 |
| 6,716,467 | B2 | * | 4/2004 | Cole et al. .................. 219/400 |
| 2004/0118392 | A1 | * | 6/2004 | McFadden ................ 126/21 A |

FOREIGN PATENT DOCUMENTS

| DE | 3020374 | A | * | 12/1981 |
| DE | 29609771 | U1 | * | 8/1996 |
| EP | 110618 | A1 | * | 6/1984 |
| FR | 2094630 | A | * | 2/1972 |
| WO | WO8401266 | A | * | 4/1984 |

* cited by examiner

*Primary Examiner*—Joseph Pelham
(74) *Attorney, Agent, or Firm*—Adams Evans P.A.

(57) ABSTRACT

This invention relates to a baking oven (1), in particular a baking cabinet which has a baking chamber (2) in which the goods to be baked can be placed, a unit (3) for heating a heating medium which has an inlet (4) to receive the heating medium from the baking chamber (2) and an outlet (5) for dispensing the heated heating medium into the baking chamber (2) and a first flow channel (6) for conveying the heating medium between the baking chamber (2) and the inlet (4) and a second flow channel (7) for conveying the heating medium between the outlet (5) and the baking chamber (2). To permit simple regulation of the flow of heating medium, it is provided according to this invention that a throttle element (8, 9) is installed in the area of at least one of the flow channels (6, 7) so that the flow resistance in the respective flow channel (6, 7) can be varied.

13 Claims, 1 Drawing Sheet

BAKING OVEN

Figure 1:
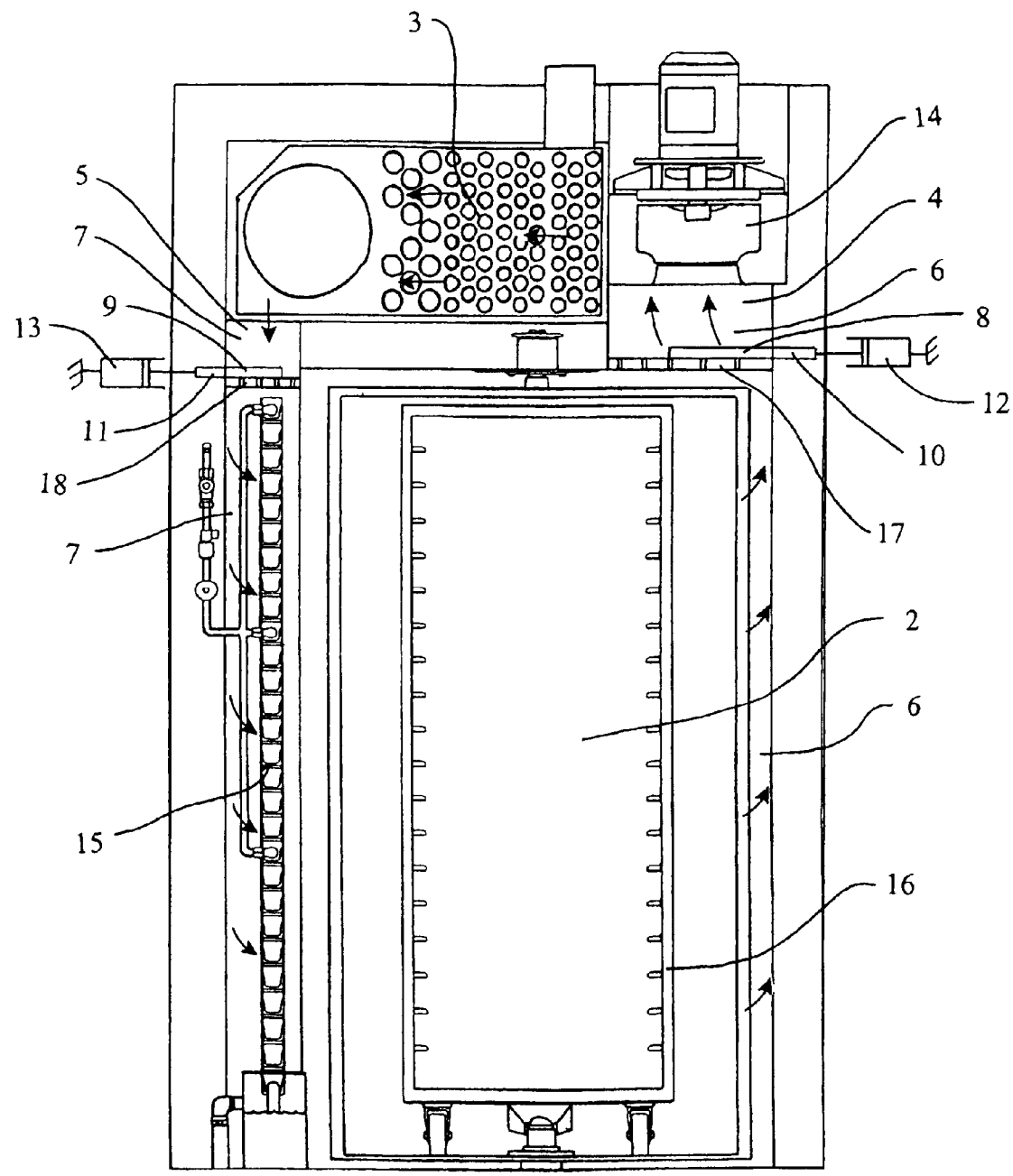
Figure 1:
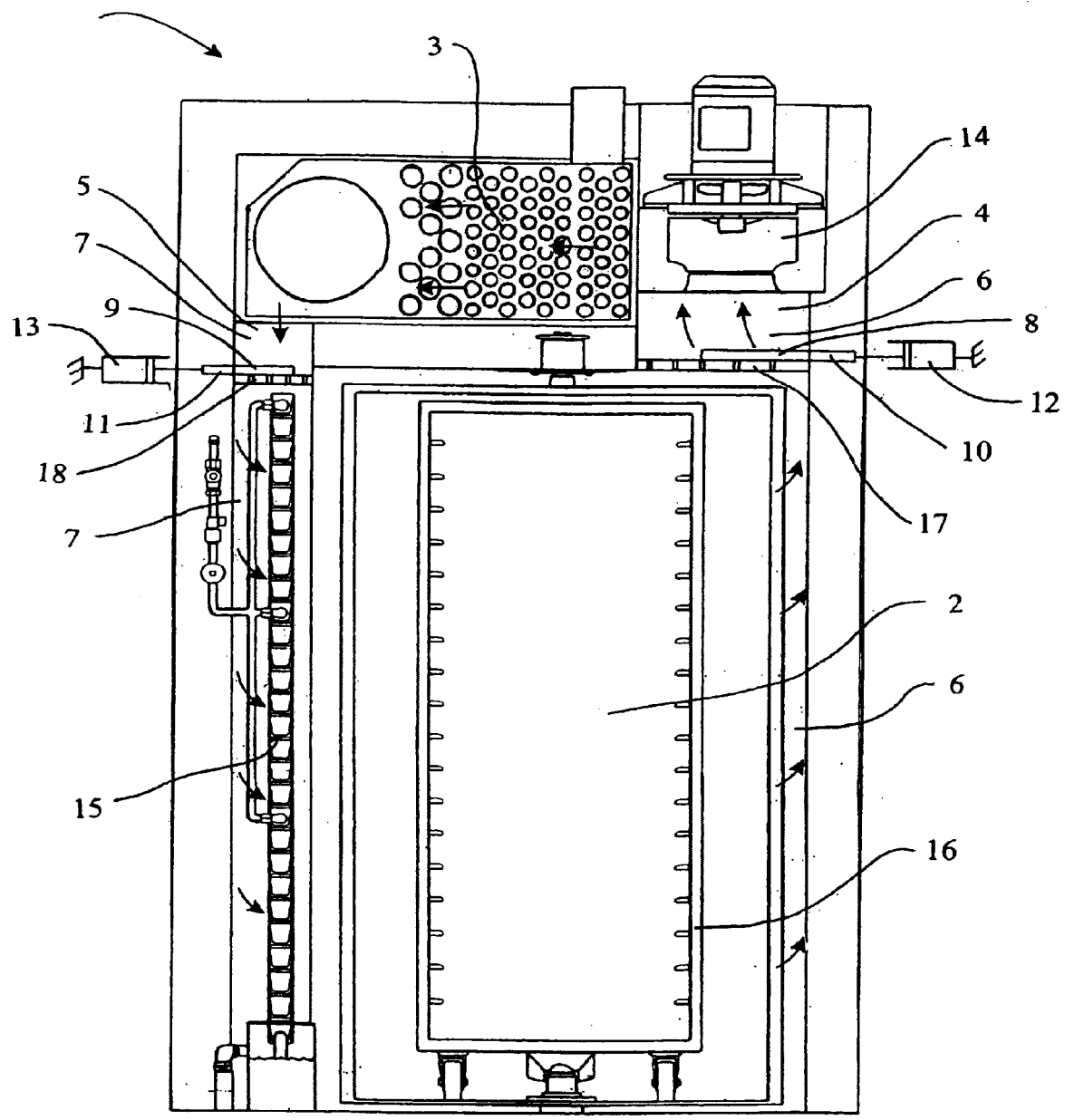
Figure 1:
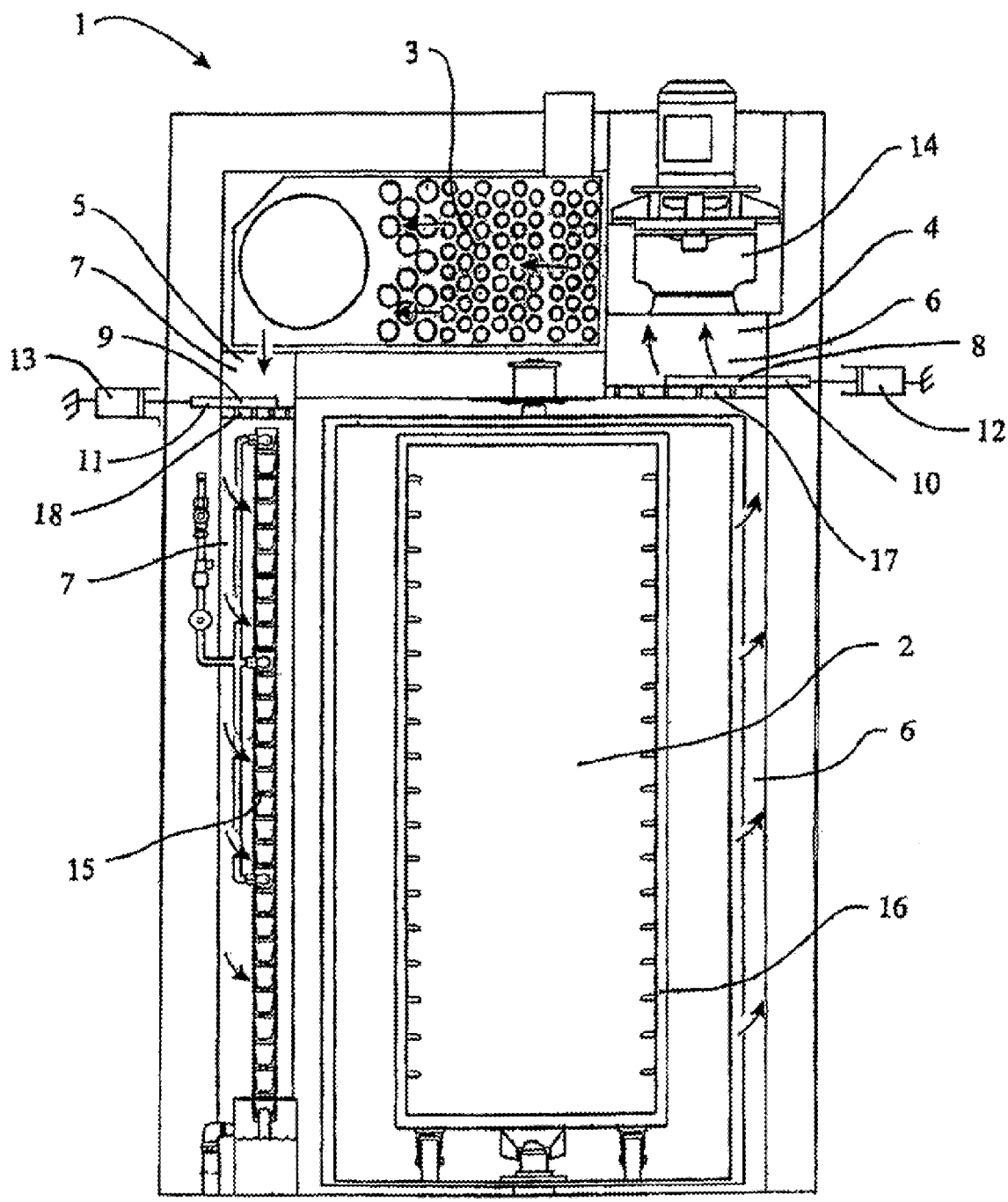

This application is a national stage application, according to Chapter I of the Patent Cooperation Treaty.

This invention relates to a baking oven, in particular a baking cabinet, comprising a baking chamber into which the goods to be baked can be introduced, a unit for heating a heating medium, having an inlet for receiving the heating medium from the baking chamber and an outlet for dispensing the heated heating medium into the baking chamber, and comprising a first flow channel for conveying the heating medium between the baking chamber and the inlet and a second flow channel for conveying the heating medium between the outlet and the baking chamber. Therefore, as a result, this forms a closed heating circuit in which the heating medium, such as air, circulates.

A baking oven of the generic type is known from German Patent Application DE 197 45 515 A1. The baking oven described there has a baking chamber in which the baking process is carried out by using hot air. For this purpose, a heating register (heating air unit, heat exchanger) is provided and is situated in the upper area of the baking oven.

The heating register has a ventilating fan driven by an electric motor, drawing air from the baking chamber through a first flow channel and supplying it to heating elements and conveying the heated air from the heating register into the baking chamber through a second flow channel. The hot air thus flows through the baking chamber for baking.

Essentially all that is necessary with the design of generic baking ovens is for a flow channel to be provided. In this case, the heating unit is connected directly to the baking chamber at its inlet or outlet.

In the case of baking ovens of this type, it has proven difficult to accomplish accurate regulation of the quantity of heating medium supplied by the heating register to the baking chamber. German Patent Application DE 197 45 515 A1 proposes in this regard that the power expended by the electric motor to drive the ventilating fan be determined and used to regulate the air circulation. One problem in this conjunction is the relatively great equipment complexity and control technology required.

As an alternative to the solution described in German Patent Application DE 197 45 515 A1, baking ovens have been proposed in which changes in the air spirals or the fan itself have been made to achieve a variable increase or decrease in the air circulation rate. These changes have involved in particular the intake nozzles of the ventilating fan or the spiral form of the fan spiral. Use of variably adjustable air scoops has also been discussed.

The object of this invention is to improve upon a baking oven of the type defined above such that it is possible to achieve accurate regulation of the quantity of heating medium with which the baking chamber is supplied at the lowest possible expenditure. Furthermore, the susceptibility to problems is to be minimized by using the simplest possible equipment design.

The solution to this problem achieved by the present invention is characterized in that a throttle element with which the flow resistance in the flow channel can be varied is situated in the area of at least one flow channel.

Thus, this invention provides for a throttle element in at least one location in the flow channel where the heating medium is flowing, so that the flow in the channel can be altered. It is of course also possible to provide a plurality of throttle elements in one flow channel.

When a design is selected in which the unit for heating the heating medium is connected directly to the baking chamber so that the length of the one flow channel tends toward zero, then the throttle element may also be situated along such very short flow channels. In the case of shop baking ovens, for example, there are known designs in which the air is pulled out of the baking chamber through an opening in one of the walls of the baking chamber directly into the heating fan. To implement the throttle element according to this invention, a slide valve may then be installed in this recess, for example, so that the flow cross section of the recess can be increased or reduced.

The throttle element may be arranged in the first flow channel, in which case it is then advantageously possible to provide for the throttle element to be situated in the immediate vicinity of the unit for heating the heating medium.

Alternatively or additionally, the throttle element may also be arranged in the second flow channel, in which case here again it may be situated in the immediate vicinity of the unit for heating the heating medium.

It is especially preferable for one throttle element to be arranged in each of the two flow channels, so that this in particular yields the advantage that the baking chamber can be hermetically sealed from the heating register, which is helpful in particular when using a so-called steam vapor apparatus.

To achieve an especially simple design, the throttle element may have a slide valve with which at least a portion of the cross section of the flow channel may be covered. The slide valve may be connected to an operating element, in which case an electric, pneumatic or hydraulic actuating element may be used. However, manual operation of the slide valve is of course also conceivable, e.g., using an analog controller.

Furthermore, the ventilating fan of the heating register is also situated in immediate proximity to the first flow channel. If necessary, a plurality of such ventilating fans may also be provided for circulation of the heating medium.

In addition, the baking oven may be equipped with one or more steam vapor units with which steam vapors can be produced in the hot air stream by adding water.

Essentially it does not matter which heating medium is used to heat the baking space. It is especially advantageous to use air because this heating medium does not have any negative effect on the baked goods. The air may be heated, e.g., by flowing through a heat exchanger or by flowing over an electric heating coil. As an alternative to air, it is also conceivable to use the combustion gases of a gas burner as the heating medium.

The baking oven according to this invention has a simple design; nevertheless, it is ensured that a simple and accurate adjustment of the amount of air flowing through the baking chamber is made possible.

The drawing illustrates one exemplary embodiment of this invention. The single figure shows schematically a section through a baking oven which is designed as a baking cabinet.

The baking oven 1 has a baking chamber 2 in which the goods to be baked are placed. In the embodiment a wagon 16 is provided, which may accommodate a plurality of baking sheets and can be inserted into the baking chamber 2. The baking itself is accomplished by hot air, which is generated in an air heating unit 3 (heat exchanger, heating register). The hot air is conveyed in a closed circuit through the baking chamber 2 so the baking oven is operated in circulating air operation. To do so, the baking chamber 2 is connected to the heating register 3 by a first flow channel 6, with the flow channel 6 ending at the air inlet 4 of the heating register 3. In addition, a second flow channel 7 is also provided, connecting the heating register 3 to the baking chamber 2; the flow channel 7 begins at the air outlet 5 of the heating register 3. The air is conveyed by a ventilating fan 14. This yields an air circulation which is indicated by arrows in the figure.

For simple and accurate adjustment of the air flow rate which is passed through the baking chamber 2, there are two throttle elements 8 and 9 in the flow area. Throttle element 8 is situated in the first flow channel 6, namely directly beneath the air inlet 4 of the heating register 3, i.e., beneath the ventilating fan 14. The second throttle element 9 is situated at the air outlet 5 of the heating register 3, i.e., at the beginning of the second flow channel 7, as seen in the direction of flow.

The throttle elements 8, 9 have a simple design: a slide valve 10 or 11 is situated on a base plate 17 or 18 having a plurality of through-openings. This slide valve 10 or 11 is connected to an actuating element 12 or 13. In the figure the actuating element 12 or 13 is diagramed schematically as a piston-cylinder unit. In most cases, however, operation by electric motor would be used.

By activating the operating elements 12 and/or 13, slide valve 10 and/or 11 may be displaced so that the cross section of flow channel 6 and/or 7 is covered or released to a greater or lesser extent. If the slide valve 10 and/or 11 is withdrawn completely from the flow channel 6 and/or 7, there is no longer any flow resistance in the flow channel 6 and/or 7 so that the greatest possible amount of heating air can flow through the baking chamber 2 per unit of time.

However, if the slide valve 10 and/or 11 is moved into the flow channel 6 and/or 7, it presents a flow resistance, which results in a reduction in the air throughput. Thus, the flow resistance in the system changes, depending on the position of the slide valve 10 and/or 11, so that more or less air is conveyed per unit of time.

Therefore, it is possible to regulate in a simple manner the adjustment of the amount of heating air flowing through the baking chamber per unit of time, which is critical for the baking operation. This eliminates the need for any influence on the triggering of the motor of the ventilating fan 14. Instead, the electric motor of the ventilating fan 14 may be supplied with a constant power.

The special arrangement of the two throttle elements 8 and 9 with their slide valves 10 and 11 also permits advantageous operation when using steam in particular. The baking oven 1 is equipped with a steam vapor apparatus 15 with which water can be added to the flow of hot air. The resulting vapor supports the baking process.

The baking chamber 2 can be hermetically sealed from the heating register 3 by completely closing the flow cross sections of the flow channels 6 and 7 by advancing the slide valves 10 and 11 to the full extent.

On activation of the steam vapor apparatus 15, the resulting vapor remains in the baking chamber 2; it cannot escape upward into the area of the heating register 3, but instead it is available for the actual baking process for which it is needed. Without the hermetic seal, the vapor would escape upward into the heating register and would be lost for the baking process.

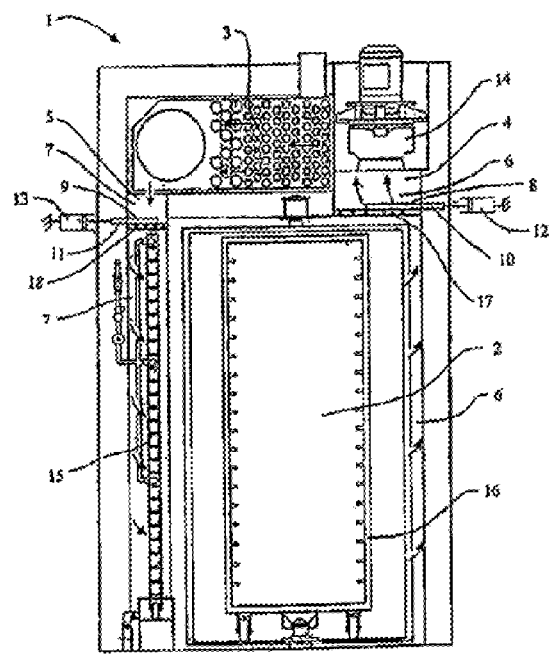

What is claimed is:

1. A baking oven (1) in particular a baking cabinet, comprising:
   (a) a baking chamber (2) into which the goods to be baked can be introduced,
   (b) a unit (3) for heating a gaseous heating medium, in particular air, having an inlet (4) to receive the heating medium from the baking chamber (2) and an outlet (5) for dispensing the heated heating medium into the baking chamber (2), and
   (c) a first flow channel (6) for conveying the heating medium between the baking chamber (2) and the inlet (4) and/or a second flow channel (7) for conveying the heating medium between the outlet (5) and the baking chamber (2), characterized in that at least one throttle element (8, 9) with which the flow resistance in the respective flow channel (6, 7) can be altered is arranged in the first or second flow channel (6, 7) in the immediate vicinity of the unit (3).

2. The baking oven according to claim 1, characterized in that the throttle element (8) is arranged in the first flow channel (6).

3. The baking oven according to claim 1, characterized in that the throttle element (9) is arranged in the second flow channel (7).

4. The baking oven according to claim 1, characterized in that at least one throttle element (8, 9) is arranged in each of the flow channels (6, 7).

5. The baking oven according to claim 4, characterized in that the throttle element (8, 9) has a slide valve (10, 11) with which at least a portion of the cross section of the flow channel (6, 7) can be covered.

6. The baking oven according to claim 5, characterized in that the slide valve (10, 11) is connected to an operating element (12, 13).

7. The baking oven according to claim 6, characterized in that the operating element (12, 13) can be driven manually.

8. The baking oven according to claim 6, characterized in that the operating element (12, 13) can be driven electrically, pneumatically or hydraulically.

9. The baking oven according to claim 8, characterized in that the unit for heating the heating medium (3) has a ventilating fan (14) which is situated in particular in the immediate vicinity of the first flow channel (6).

10. The baking oven according to claim 9, characterized in that it has at least one steam vapor apparatus (15).

11. The baking oven according to claim 10, characterized in that combustion gas from a gas burner is used as the heating medium.

12. The baking oven according to claim 10, characterized in that air is used as the heating medium and is heated as it flow through a heat exchanger or as it flows over an electric heating coil.

13. The baking oven according to claim 12, characterized in that the baking oven is designed in the manner of a rack oven or in the manner of a shop baking oven.

* * * * *

UNITED STATES PATENT AND TRADEMARK OFFICE
CERTIFICATE OF CORRECTION

PATENT NO. : 6,909,069 B2
DATED : June 21, 2005
INVENTOR(S) : Kerler et al.

It is certified that error appears in the above-identified patent and that said Letters Patent is hereby corrected as shown below:

The Title page showing an illustrative figure should be deleted, and substitute therefore the attached title page consisting of Fig. 1.

The drawing sheet consisting of fig. 1 should be deleted and substitute therefore the attached drawing sheet, consisting of Fig. 1.

Signed and Sealed this

Seventh Day of February, 2006

JON W. DUDAS
*Director of the United States Patent and Trademark Office*

United States Patent
Kerler et al.

(10) Patent No.: US 6,909,069 B2
(45) Date of Patent: Jun. 21, 2005

(54) BAKING OVEN

(75) Inventors: Ernst Kerler, Ganheim (DE); Michael Koos, Heugrumbach (DE); Leo Holzinger, Schwebenried (DE)

(73) Assignee: Miwe Michael Wenz GmbH, Arnstein (DE)

(*) Notice: Subject to any disclaimer, the term of this patent is extended or adjusted under 35 U.S.C. 154(b) by 0 days.

(21) Appl. No.: 10/433,025
(22) PCT Filed: Aug. 9, 2002
(86) PCT No.: PCT/IB02/03171
§ 371 (c)(1), (2), (4) Date: Oct. 24, 2003
(87) PCT Pub. No.: WO02/089588
PCT Pub. Date: Nov. 14, 2002

(65) Prior Publication Data
US 2004/0055589 A1 Mar. 25, 2004

(30) Foreign Application Priority Data
Oct. 1, 2001 (DE) .................................. 101 48 548

(51) Int. Cl.⁷ .............................. A21B 1/26; A21B 3/04
(52) U.S. Cl. ............................................ 219/400; 126/21 A
(58) Field of Search .................................. 219/400, 401, 219/385, 386; 126/20, 21 A

(56) References Cited

U.S. PATENT DOCUMENTS

| 4,516,012 A | * | 5/1985 | Smith et al. | 219/400 |
| 4,831,238 A | * | 5/1989 | Smith et al. | 219/400 |
| 4,873,107 A | * | 10/1989 | Archer | 426/520 |
| 6,716,467 B2 | * | 4/2004 | Cole et al. | 219/400 |
| 2004/0118392 A1 | * | 6/2004 | McFadden | 126/21 A |

FOREIGN PATENT DOCUMENTS

| DE | 3020374 A | * | 12/1981 |
| DE | 29609771 U1 | * | 8/1996 |
| EP | 110618 A1 | * | 6/1984 |
| FR | 2094630 A | * | 2/1972 |
| WO | WO8401266 A | * | 4/1984 |

* cited by examiner

*Primary Examiner*—Joseph Pelham
(74) *Attorney, Agent, or Firm*—Adams Evans P.A.

(57) ABSTRACT

This invention relates to a baking oven (1), in particular a baking cabinet which has a baking chamber (2) in which the goods to be baked can be placed, a unit (3) for heating a heating medium which has an inlet (4) to receive the heating medium from the baking chamber (2) and an outlet (5) for dispensing the heated heating medium into the baking chamber (2) and a first flow channel (6) for conveying the heating medium between the baking chamber (2) and the inlet (4) and a second flow channel (7) for conveying the heating medium between the outlet (5) and the baking chamber (2). To permit simple regulation of the flow of heating medium, it is provided according to this invention that a throttle element (8, 9) is installed in the area of at least one of the flow channels (6, 7) so that the flow resistance in the respective flow channel (6, 7) can be varied.

13 Claims, 1 Drawing Sheet

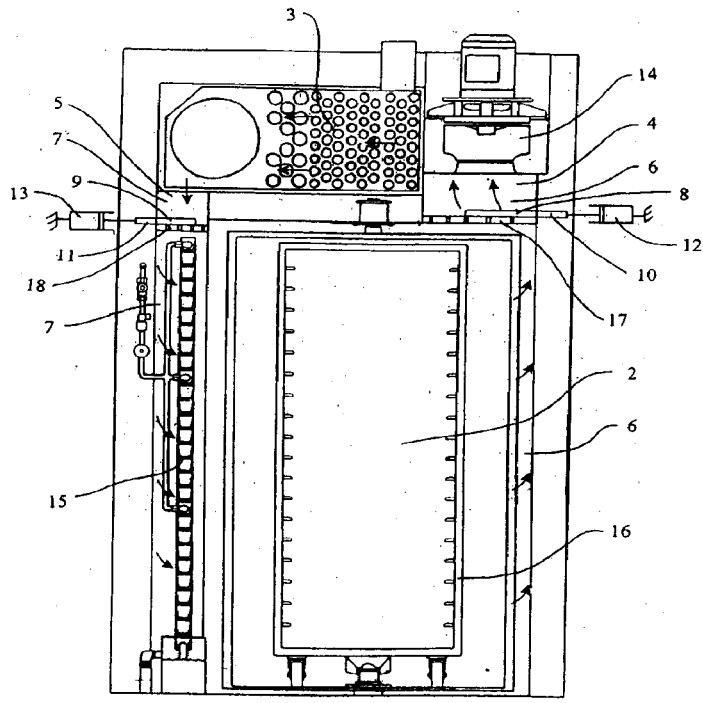

UNITED STATES PATENT AND TRADEMARK OFFICE
CERTIFICATE OF CORRECTION

| | |
|---|---|
| PATENT NO. | : 6,909,069 B2 |
| APPLICATION NO. | : 10/433025 |
| DATED | : June 21, 2005 |
| INVENTOR(S) | : Kerler et al. |

It is certified that error appears in the above-identified patent and that said Letters Patent is hereby corrected as shown below:

The Title page showing an illustrative figure should be deleted, and substitute therefore the attached title page consisting of Fig. 1.

The drawing sheet consisting of fig. 1 should be deleted and substitute therefore the attached drawing sheet, consisting of Fig. 1.

This certificate supersedes Certificate of Correction issued February 7, 2006.

Signed and Sealed this

Thirteenth Day of November, 2007

JON W. DUDAS
*Director of the United States Patent and Trademark Office*

(12) United States Patent
Kerler et al.

(10) Patent No.: US 6,909,069 B2
(45) Date of Patent: Jun. 21, 2005

(54) BAKING OVEN

(75) Inventors: Ernst Kerler, Ganheim (DE); Michael Koos, Heugrumbach (DE); Leo Holzinger, Schwebenried (DE)

(73) Assignee: Miwe Michael Wenz GmbH, Arnstein (DE)

(*) Notice: Subject to any disclaimer, the term of this patent is extended or adjusted under 35 U.S.C. 154(b) by 0 days.

(21) Appl. No.: 10/433,025
(22) PCT Filed: Aug. 9, 2002
(86) PCT No.: PCT/IB02/03171
§ 371 (c)(1),
(2), (4) Date: Oct. 24, 2003
(87) PCT Pub. No.: WO02/089588
PCT Pub. Date: Nov. 14, 2002

(65) Prior Publication Data
US 2004/0055589 A1 Mar. 25, 2004

(30) Foreign Application Priority Data
Oct. 1, 2001 (DE) .................... 101 48 548

(51) Int. Cl.$^7$ .................... A21B 1/26; A21B 3/04
(52) U.S. Cl. .................... 219/400; 126/21 A
(58) Field of Search .................... 219/400, 401, 219/385, 386; 126/20, 21 A

(56) References Cited
U.S. PATENT DOCUMENTS

| 4,516,012 A | * | 5/1985 | Smith et al. | 219/400 |
| 4,831,238 A | * | 5/1989 | Smith et al. | 219/400 |
| 4,873,107 A | * | 10/1989 | Archer | 426/520 |
| 6,716,467 B2 | * | 4/2004 | Cole et al. | 219/400 |
| 2004/0118392 A1 | * | 6/2004 | McFadden | 126/21 A |

FOREIGN PATENT DOCUMENTS

| DE | 3020374 A | * | 12/1981 |
| DE | 29609771 U1 | * | 8/1996 |
| EP | 110518 A1 | * | 6/1984 |
| FR | 2094630 A | * | 2/1972 |
| WO | WO8401266 A | * | 4/1984 |

* cited by examiner

Primary Examiner—Joseph Pelham
(74) Attorney, Agent, or Firm—Adams Evans P.A.

(57) ABSTRACT

This invention relates to a baking oven (1), in particular a baking cabinet which has a baking chamber (2) in which the goods to be baked can be placed, a unit (3) for heating a heating medium which has an inlet (4) to receive the heating medium from the baking chamber (2) and an outlet (5) for dispensing the heated heating medium into the baking chamber (2) and a first flow channel (6) for conveying the heating medium between the baking chamber (2) and the inlet (4) and a second flow channel (7) for conveying the heating medium between the outlet (5) and the baking chamber (2). To permit simple regulation of the flow of heating medium, it is provided according to this invention that a throttle element (8, 9) is installed in the area of at least one of the flow channels (6, 7) so that the flow resistance in the respective flow channel (6, 7) can be varied.

13 Claims, 1 Drawing Sheet